United States Patent [19]
McKinney, Jr et al.

[11] 3,904,519
[45] Sept. 9, 1975

[54] REVERSE OSMOSIS PROCESS USING CROSSLINKED AROMATIC POLYAMIDE MEMBRANES

[75] Inventors: Ray McKinney, Jr, Raleigh; William L. Hofferbert, Durham, both of N.C.

[73] Assignee: The United States of America as represented by the Secretary of the Interior, Washington, D.C.

[22] Filed: Oct. 19, 1971

[21] Appl. No.: 191,818

[52] U.S. Cl. .................................. 210/23; 210/433
[51] Int. Cl. ............................................ B01d 13/00
[58] Field of Search ........ 210/22, 23, 321, 490, 500

[56] References Cited
UNITED STATES PATENTS

| | | | |
|---|---|---|---|
| 3,140,256 | 7/1964 | Martin et al. | 210/500 X |
| 3,276,996 | 10/1966 | Lazare | 210/22 |
| 3,423,491 | 1/1969 | McLain et al. | 210/500 X |
| 3,524,546 | 8/1970 | Hoehn et al. | 210/23 |
| 3,554,379 | 1/1971 | Pye | 210/500 X |
| 3,567,632 | 3/1971 | Richter et al. | 210/500 X |
| 3,585,125 | 6/1971 | Hoke | 210/500 X |

*Primary Examiner*—Frank A. Spear, Jr.
*Attorney, Agent, or Firm*—William S. Brown; Donald R. Fraser

[57] ABSTRACT

Reverse osmosis membranes of improved flux or flux stability are prepared by crosslinking aromatic polyamide membranes. Crosslinking may be achieved by reaction with crosslinking reagents such as aldehydes, polyamines, polycarboxylic acids, polyisocyanates, oxidizing agents, peroxides, etc. It may also be accomplished by means of irradiation, e.g., with gamma radiation.

9 Claims, No Drawings

REVERSE OSMOSIS PROCESS USING CROSSLINKED AROMATIC POLYAMIDE MEMBRANES

Reverse osmosis has attracted considerable interest in the field of purification of saline water. In this process, a pressure in excess of the osmotic pressure of the saline water feed solution is applied to the solution separated from purified water by a semipermeable membrane. Pure water is thereby caused to diffuse through the membrane, while the salt molecules or other impurities are retained by the membrane.

Efficiency of the reverse osmosis process depends to a large extent on the nature of the membrane and numerous types of membranes, including polyamide membranes, and methods of preparing them have been described in the prior art, e.g., in U.S. Pat. Nos. 3,133,132; 3,344,214; 3,412,184; 3,439,074; 3,472,766; 3,497,541; 3,551,331; 3,567,632 and 3,585,125. These membranes are commonly cast from a solution comprising the membrane material and an organic solvent, with or without additional solution components such as water, swelling agents, etc. The membranes may be employed in the reverse osmosis process in the form of a free film or a film deposited on a porous support material.

It has now been found, in accordance with the present invention, that the flux or flux stability of aromatic polyamide membranes in reverse osmosis processes may be substantially improved by crosslinking the membranes. This may be accomplished by means of a variety of processes, described below, all of which result in improved flux or flux stability, or both.

Linear polyamides are conventionally prepared by condensation of diamines with dicarboxylic acids, or by condensation of amino carboxylic acids. The aromatic polyamides, from which the membranes of the invention are prepared, are characterized by the presence of aromatic groups in the chains between the functional groups, i.e., the amide groups. The aromatic groups will generally be phenylene groups, but may also include naphthylene, 2,5-oxadiazolylene, 3,5-triazolylene, etc., and may be ortho, meta or para substituted.

The aromatic polyamides are generally prepared by low temperature, i.e., about 0° to 10°C, solution or interfacial polymerization, in which the reaction is direct amidation, i.e., reaction of amine groups and carboxyl groups with elimination of water. For this type of reaction dicarboxylic acid chlorides, rather than the corresponding acids, are usually employed and the condensation by-product is hydrochloric acid. Optimum molecular weights and viscosities of the aromatic polyamides may vary considerably, depending on the specific type of polymer, type of subsequent cross-linking employed, etc., but will usually have a molecular weight of about 20,000 to 70,000 and a viscosity of about 6,000 to 200,000 poise. Following polymerization, hydrochloric acid formed in the reaction is neutralized with a base such as $CaCO_3$, $Li_2CO_3$, $Ca(OAc)_2$, LiOAc, etc.

Examples of linear aromatic polyamides that may be employed in the invention are given in Table 1 in terms of the structural formula of the characteric group of which the polymer chain is composed. As illustrated in structures 15 and 16 of the table, the group may include a hydrophilic or polar group, such as a carboxylic acid group, in the polymer backbone. Such a group has been found to impart increased flux level to the membrane, as well as providing for ionic cross-linking, as described below. Other suitable polar groups include amine groups, hydroxyl groups, $O(CH_2CH_2O)_xH$ groups, etc.

TABLE 1

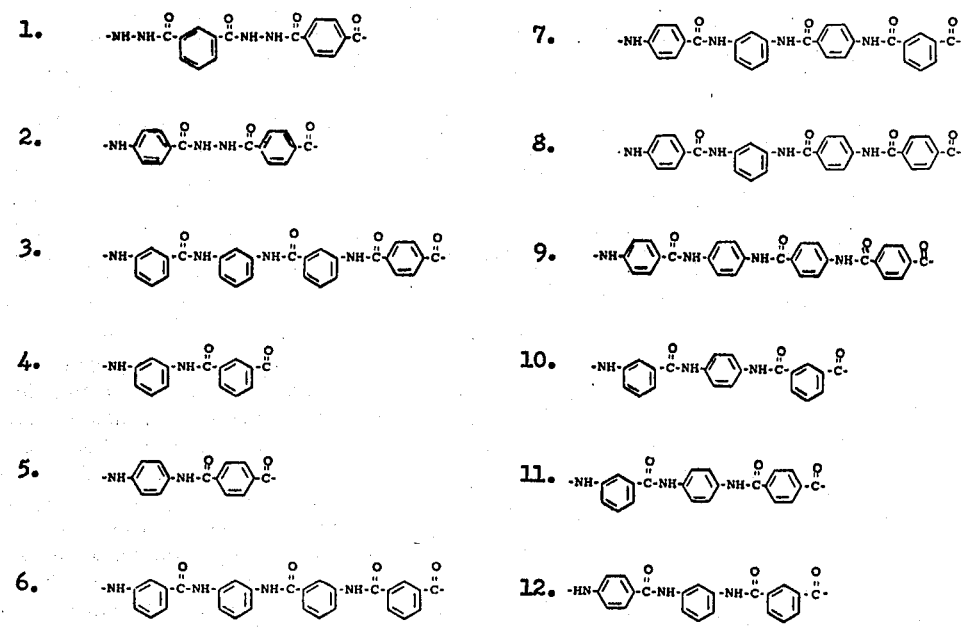

Table I – Continued

13. 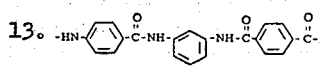

14. 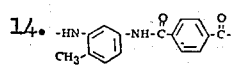

15. 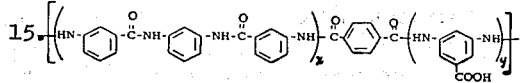

16. 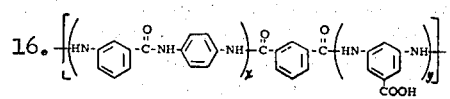

Asymmetric aromatic polyamide films, either flat or tubular, for reverse osmosis are conventionally prepared by casting a film of the polymer, usually about 5 to 35 mils in thickness, from solution in a suitable solvent, evaporating the solvent at a rate sufficient to establish a concentration gradient in the solution, and fixing the gradient by coagulation of the polymer in solution with a suitable nonsolvent, usually water, and subsequent extraction of residual solvent.

Suitable solvents for the polymers include dimethylformamide, dimethylacetamide, dimethylsulfoxide, hexamethylphosphoramide, tetramethyl urea, etc. The casting solution should also contain a salt, such as $CaCl_2$ or $LiCl$, in a amount sufficient to reduce the vapor pressure of the solvent and to improve the thermal stability of the solvent system, usually about 25 to 45 percent by weight of polymer. $CaCl_2$ is usually conveniently provided by neutralizing the initial acidic (HCl) solution of the polyamide with $CaCO_3$. The concentration of the polymer in the solvent solution will usually range from about 3 to 30 percent by weight, with lower concentrations usually giving better values of both flux and flux stability.

Solvent evaporation should be at a rate, and for a period of time, just sufficient to form a uniform, continuous solvent-free zone at the air-solution interface. Evaporation rate is dependent on temperature, drying time and amount of salt in the casting solution, and these variables should be correlated to achieve optimum flux and selectivity of the resulting membrane. Determination of optimum values of these variables for a specific type of membrane is best accomplished experimentally and is readily accomplished by one skilled in the art. Generally, drying temperatures of about 50° to 150°C for a period of about 15 to 200 minutes is satisfactory.

Coagulation and extraction of residual solvent are effected in a nonsolvent such as water, an aqueous NaCl solution, acetone, polyethylene glycol, etc., at a temperature of about 0° to 35°C for a period of about 12 to 24 hours. Again, optimum conditions are best determined experimentally.

As discussed above, crosslinking of the linear aromatic polyamides is effected, according to the invention, in order to improve flux or flux stability of the resulting membranes in reverse osmosis processes. Flux is a measure of the rate of flow of feed water through the membrane and is generally measured in terms of gallons per square foot per day (gfd). Flux stability is a measure of the ability of a membrane to maintain an adequate flow rate for a period of time and is defined by the equation, $$\epsilon = d \log J / d \log t,$$

where $\epsilon$ is the index of flux stability, $J$ is flux and $t$ is time. Thus, $\epsilon$ represents the slope taken from a log-flux-log-time plot, and is always some negative value, ideally zero which would represent no loss of membrane flux with time.

Crosslinking may be achieved by means of conventional crosslinking reagents such as formaldehyde, as an aqueous solution or as paraformaldehyde, trioxane or glyoxal. Other aldehydes such as terephthaldehyde may also be used. These are preferably employed in the presence of an acid catalyst such as hydrochloric acid or sulfuric acid, with the latter generally being preferred. The crosslinking reaction involves the addition of the reagent via proton extraction, probably occurring largely on the benzene ring and, perhaps, to some extent at the amide nitrogen. Crosslinking with these reagents may be accomplished by any one of three different methods: (1) addition of the reagent and catalyst directly to the casting solution, (2) addition of the reagent and catalyst to the coagulation bath and (3) post treatment of the finished conventional membrane with the reagent and catalyst in an aqueous solution. The first and third methods have generally been found to give best results.

Optimum proportions of crosslinking reagent and catalyst, as well as temperature and reaction time, will vary considerably with the specific polyamide and the specific crosslinking reagent and are best determined experimentally. However, amounts of crosslinking reagent in the amount of about 1 to 25 percent by weight, based on the polyamide, with amounts of acid catalyst sufficient to provide a pH of about 1 to 4 in the casting solution or post-treatment bath, are usually satisfactory. Temperatures for the crosslinking will be those normally employed in the conventional casting and coagulating steps, or about 15° to 40°C for post-treatment, while reaction times are generally in the range of about 3 to 24 hours.

A second means of achieving crosslinking is by means of irradiation. According to this method, the finished, i.e., coagulated and extracted, membrane is exposed to radiation such as ultra-violet, x-rays, gamma rays, and high energy electrons, with the preferred form of radiation being gamma radiation at a dose rate of about $8.75 \times 10^5$ Rads/hour for a period of about ½ to 12 hours.

In addition, the irradiation may be carried out in the presence of monomers capable of undergoing free radical polymerization. By this means, crosslinking is achieved via free radical polymerization, with the point of polymerization initiation occurring at the polymer backbone. Examples of suitable monomers are acrylic acid, ethylene glycol dimetharylate, trimethylolpropane trimethacrylate, acrylonitrile and mixtures thereof. A combination of acrylic acid and ethylene glycol dimethacrylate, or the bis-maleimide of 1,3 bis(-3-amino-benzamide)benzene, have been found to be particularly effective, both giving a flux stability value ($\epsilon$) of zero.

Crosslinking may also be accomplished by means of crosslinking agents having at least two functional groups which react with active cites on the polymer molecule. These agents include polyamines, polycarboxylic acids, or the corresponding acid halides or anhydrides, polyisocyanates, oxidizing agents such as chromium trioxide, potassium permanganate or perchlorate, etc. A particularly effective means of crosslinking has been found to be that of ionic crosslinking. According to this procedure, a hydrophilic or polar group is introduced into the linear polyamide chain by including reactants containing the polar group in preparation of the linear polyamide. Suitable polar groups include carboxyl, amine, amic acid, etc. Polar group-containing compounds which may be employed in preparation of the linear polyamide include 3,5-diamino benzoic acid, pyromellitic dianhydride and benzophenone dianhydride. Generally, significant increases in flux have been found to result from introduction of the polar group itself. However, subsequent ionic crosslinking results in substantial improvements in flux stability, as well as flux.

The crosslinking agent employed in one whose functional groups will form ionic bonds with the polar groups introduced into the linear polymer chain. For example, when the polar groups are carboxylic acid groups, diamines, such as p-phenylene diamine, p-aminobenzhydrazide, 1,4-cyclohexane bis(methyl amine) and aliphatic diamines from methylene diamine to dodecane diamine, may be used. When the polar groups are amine groups, diacid groups, such as terephthalic and isophthalic acids, oxalic, malonic, succinic, glutaric, adipic, etc., may be used.

When the polar groups are carboxylic acid groups, it is generally preferable to exchange the membrane, following casting, coagulation and extraction, with an acidic aqueous solution, e.g., HCl solution, in order to convert the carboxyl groups completely to carboxylic acid groups for purposes of crosslinking. This is necessitated by neutralization of some or all of the carboxylic acid groups in the neutralization step following polymerization.

A particularly effective linear polyamide has been found to be one resulting from copolymerization of 1,3-bis(3-aminobenzamide)benzene, terephthaloyl chloride and 3,5-diamino benzoic acid (DABA). The characteristic structure of this polymer is shown in structure 15 of Table 1. Crosslinking of this polymer is conveniently accomplished by reaction with an aqueous solution of p-phenylene diamine resulting in a membrane having substantially improved flux and flux stability, as illustrated in the Example below.

Another preferred linear polyamide is that illustrated in structure 16 of Table 1. This polyamide is prepared by copolymerizing 3-4'-diaminobenzanilide, isophthaloyl chloride and DABA, preferably also crosslinked by reaction with p-phenylene diamine. The mole ratio of 3-4'-diaminobenzanilide to DABA may range from about 95/5 to 50/50, with the 3,4'-diaminobenzanilide and isophthaloyl chloride being present in approximately equal molar amounts. Similar mole ratios of 1,3-bis(aminobenzamide) benzene to DABA and to terephathaloyl chloride are suitable for the above polymer. Suitable molecular weights for both of these polymers, i.e., those that result in good film and fiber forming properties, will range from about 10,000 to 70,000.

Optimum reaction conditions for ionic crosslinking will vary considerably depending on the specific linear polyamide, type and number of polar groups, crosslinking agent employed, desired properties of the membrane product, i.e., flux, flux stability, selectively, etc., and are best determined experimentally. In the case of the above-discussed preferred embodiments, however, the diamine is preferably used as an aqueous solution having a concentrtion of about 0.3 to 0.6 percent by weight, with the amount of diamine being about 20 to 40 percent by weight based on the linear polyamide. The reaction may be carried out simply by immersing the polyamide in the solution of crosslinking agent at a temperature of about 15° to 30°C for a period of about 16 to 48 hours.

In addition to the above-described ionic bonds, the crosslinking may involve formation of other types of bonds, e.g., amides, esters or sulfenamides. Thus, where polyamines are employed for crosslinking polymers containing carboxylic acid groups at higher temperature, e.g., above about 250°F, the reaction will involve amide formation. Ester crosslinking may take place when polymers containing carboxylic acid groups are crosslinked with polyhydroxy or polyepoxy compounds.

Diisocyanates may also be employed for crosslinking the aromatic polyamides. This involves reaction of the isocyanate with the active hydrogen on the amide functional group. Suitable diisocyanates include methylene diphenyl isocyanate, toluene 2,4-diisocyanate, para meta phenylene diisocyanate, 4,4'-oxybis(phenylene isocyanate), etc.

Crosslinking of the aromatic polyamides may also be accomplished by means of free radical initiators such as peroxides and azo compounds, e.g., 2,2'-azobisisobutyronitrile and α,α'-azobis(α,γ-dimethylvaleronitrile). These compounds are believed to function by formation of free radical sites on the polymer chain, thereby permitting direct covalent bonding between chains. Suitable peroxides include benzoyl peroxide, lauroyl peroxide, pelargonyl peroxide, t-butyl peroxyprivalate, etc.

The following examples will serve to more particularly illustrate the invention.

EXAMPLE 1

In this example crosslinking was accomplished by means of post treatment of the linear polyamide membrane with a 1.0 percent aqueous solution of formaldehyde. This solution also contained 1.0 percent sulfuric acid.

The linear polyamide was the type shown in structure No. 3 in Table 1. It was prepared by copolymerizing 1,3-bis(3-aminobenzamide) benzene and terephthaloyl chloride in equal molar amounts, at a temperature of −15°C, in solution in dimethylacetamide containing 5 percent LiCl, to a molecular weight of 30,000. The membrane was prepared by casting mils on a glass plate, followed by oven drying at 105°C for 180 minutes and coagulation in a 24°C water bath for a period of 16 hours.

The membrane was treated in the formaldehyde solution at 24°C for a period of 18 hours to effect crosslinking. It was then removed from the formaldehyde solution, drained, and washed with water, and was then tested in a conventional reverse osmosis test cell at 1500 psi with 60,000 ppm NaCl feed. An untreated (linear) control membrane was also tested under the same conditions. Salt injection for both the treated (crosslinked) and untreated membrane was found to be 99.6. Initial flux (gfd) and flux stability ($\epsilon$) for the control were 8.7 and −0.120, respectively, while the corresponding values for the crosslinked membrane were 5.8 and −0.050. Thus, crosslinking resulted in some decrease in initial flux, but the more significant flux stability was greatly improved.

EXAMPLE 2

In this example crosslinking of a linear polyamide of the type shown in structure No. 10 in Table 1 was accomplished by the same procedure as that employed in Example 1. This polyamide was prepared by copolymerizing 3,4'-diamino-benzanilide and isophthaloyl chloride in equal amounts. Formation of the polyamide and the membrane was accomplished by the same procedure as that employed in Example 1. It was found that the crosslinked membrane had an initial flux of 10 and a flux stability of −0.12, while the control showed corresponding values of 13 and −0.18. In each case rejection was 99.7 percent.

EXAMPLE 3

In this example crosslinking was accomplished by means of post treatment of the linear polyamide membrane with a 1.0 percent aqueous solution of glyoxal di(sodium bisulfite). This solution also contained 1.0 percent sulfuric acid.

The linear polyamide was the type shown in structure No. 3 in Table 1, and was prepared as in Example 1. The membrane was also prepared by casting, drying and coagulation as in Example 1.

The membrane was treated in the glyoxal di(sodium bisulfite) solution at 24°C for a period of 24 hours to effect crosslinking. It was then removed from the treating solution, drained and washed with water, and was then tested in a reverse osmosis cell, as in Example 1. A control membrane was also tested under the same conditions and gave a salt rejection of 99.6, an initial flux of 8.7 and a flux stability of −0.120. The treated membrane showed a salt rejection of 99.7, an initial flux of 5.3, and a flux stability of −0.060. Again, flux stability was greatly improved by crosslinking.

EXAMPLE 4

In this example cross-linking was accompoished by means of irradiation.

The linear polyamide membrane was the same as that employed in Example 1, except that the formaldehyde treatment was eliminated and drying was at 105°C. It was exposed to gamma radiation at a dose rate of 8.75 × 10⁵ Rads/hr. for a period of 10 hours, and tested as in Examples 1 and 2. Initial flux and flux stability for the control (no irradiation) were 7.57 and −0.119, respectively, while the values for the irradiated membrane were 5.01 and −0.034, respectively, with both showing 99.7 salt rejection. Thus, flux stability was again greatly improved over that of the linear polymer membrane.

EXAMPLE 5

The procedure in this Example was similar to that of Example 3, except that irradiation was carried out in the presence of 10 percent, based on polymer weight, of a mixture of equal parts by weight of acrylic acid and ethylene glycol dimethacrylate. Initial flux, rejection and flux stability were found to be 4.42, 99.4 and 0.000, respectively, as compared to 5.01, 99.7 and −0.034 for the control (no irradiation or monomer). Thus, a zero value of $\epsilon$ was obtained with only minor decreases in initial flux and rejection.

EXAMPLE 6

This example was similar to that of Example 4, except that the monomer consisted of the bis-maleimide of 1,3 bis(3-aminobenzamide) benzene. The resulting initial flux, rejection and flux stability values were 3.08, 99.0 and 0.000. Thus, the value of $\epsilon$ was again reduced to zero.

EXAMPLE 7

In this example the polymer of Example 2 was crosslinked by irradiation according to the procedure employed in Example 4. The crosslinked membrane showed an initial flux of 5.81, a rejection of 98.8 and flux stability of −0.022, as compared to values 7.78, 99.0 and −0.099, respectively, for the control.

EXAMPLE 8

In this example ionic crosslinking was employed.

The linear polyamide was the type shown in structure No. 15 in Table 1. It was prepared by copolymerizing equal molar amounts of 1,3-bis-(3-aminobenzamide) benzene and terephthaloyl chloride with 3,5-diaminobenzoic acid (DABA), the mole ratio of either of the first two ingredients to DABA being 75/25. Polymerization was carried out at −15°C in solution in dimethylacetamide containing 5 percent LiCl, to a molecular weight of 10,000 to 30,000.

The membrane was prepared by casting the polyamide solution to a thickness of 20 mils on a glass plate, followed by oven drying at 105°C for 180 minutes and coagulation in 24± 1°C deionized water. The membrane was allowed to remain in the deionized water for a period of 12 hours to remove all residual solvent and salt.

This membrane (linear polyamide) was tested in a conventional reverse osmosis test cell at 1500 psi with natural seawater at a simulated 45% recovery. Salt injection was 98.7 percent, with an initial flux of 18.5 and flux stability of −0.100.

A control membrane was also prepared in the same manner except that DABA was not employed in the polymerization reaction mixture and the resulting linear polyamide, therefore, did not contain the polar carboxylic acid groups. This membrane showed a salt rejection of 99.6, an initial flux of 8.0 and a flux stability of −0.120. Thus, the incorporation of the polar groups resulted in a substantial increase in initial flux, and some improvement in flux stability, but in a decrease in rejection.

A membrane containing the polar groups, prepared as above, was placed in an HCl-water mixture adjusted to pH 2.5, for a period of 12 hours at ambient temperature of 23±1°C, in order to exchange the membrane and provide free carboxyl groups. The exchanged membrane was then washed for an additional 12 hours in deionized water to remove all residual HCl.

The membrane was then placed in aqueous 0.5 percent p-phenylene diamine solution and allowed to equilibrate for 24 hours at ambient temperature to effect crosslinking. The crosslinked membranes possess a uniforn blue coloration resulting from the p-phenylene diammonium benzoate linkage. The crosslinked membrane was washed in deionized water, changing the water frequently to remove any unreacted diamine. The membrane was then tested in the reverse osmosis test cell under the same conditions as those employed in testing the control and non-crosslinked, polar group-containing membrane and showed a rejection of 99.6, an initial flux of 11.2 and a flux stability of −0.070. Thus, the initial flux is greater than that of the control and less than that of the non-crosslinking membrane, while the flux stability is better than either.

We claim:

1. In a process for desalination of saline water by reverse osmosis comprising contacting the saline water under pressure with a reverse osmosis membrane, the improvement comprising employing as the reverse osmosis membrane a membrane consisting essentially of linear aromatic polyamide molecules that have been crosslinked by treatment with a crosslinking agent whereby a plurality of said molecules are chemically linked together, said linear aromatic polyamide molecules being composed of groups having the formula:

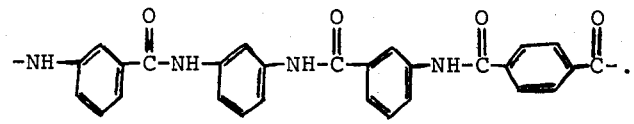

2. In a process for desalination of saline water by reverse osmosis comprising contacting the saline water under pressure with a reverse osmosis membrane, the improvement comprising employing as the reverse osmosis membrane a membrane consisting essentially of linear aromatic polyamide molecules that have been crosslinked by treatment with a crosslinking agent whereby a plurality of said molecules are chemically linked together, said linear aromatic polyamide molecules being composed of groups having the formula:

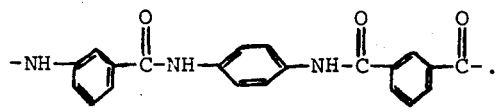

3. In a process for desalination of saline water by reverse osmosis comprising contacting the saline water under pressure with a reverse osmosis membrane, the improvement comprising employing as the reverse osmosis membrane a membrane consisting essentially of linear aromatic polyamide molecules that have been crosslinked by treatment with a crosslinking agent whereby a plurality of said molecules are chemically linked together, said linear aromatic polyamide molecules containing a plurality of carboxylic acid group substituents.

4. The process of claim 3 in which the linear aromatic polyamide molecules are composed of groups having the formula:

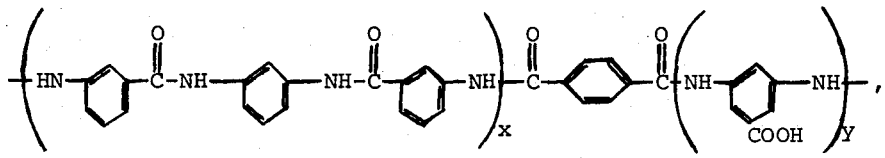

where $x = 99–70$ and $y = 1–30$.

5. The process of claim 3 in which the linear aromatic polyamide molecules are composed of groups having the formula:

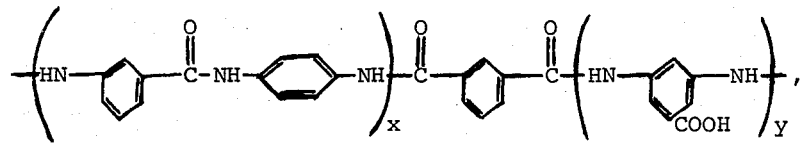

where $x = 99–10$ and $y = 1–30$.

6. The process of claim 3 in which the crosslinking agent is a diamine.

7. The process of claim 6 in which the diamine is p-phenylene diamine.

8. In a process for desalination of saline water by reverse osmosis comprising contacting the saline water under pressure with a reverse osmosis membrane, the improvement comprising employing as the reverse osmosis membrane a membrane consisting essentially of linear aromatic polyamide molecules that have been crosslinked by treatment with a crosslinking agent whereby a plurality of said molecules are chemically linked together, said linear aromatic polyamide molecules containing a plurality of amine group substituents.

9. The process of claim 8 in which the crosslinking agent is a dicarboxylic acid.

* * * * *